US009823557B2

(12) United States Patent
Saka et al.

(10) Patent No.: US 9,823,557 B2
(45) Date of Patent: *Nov. 21, 2017

(54) WAVELENGTH CONVERTING MEMBER AND PROJECTOR INCLUDING THE WAVELENGTH CONVERTING MEMBER

(71) Applicant: NICHIA CORPORATION, Anan-shi, Tokushima (JP)

(72) Inventors: Naoki Saka, Tokushima (JP); Yoshinori Murazaki, Komatsushima (JP); Isamu Niki, Anan (JP)

(73) Assignee: Nichia Corporation, Anan-Shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/430,735

(22) Filed: Feb. 13, 2017

(65) Prior Publication Data

US 2017/0153536 A1 Jun. 1, 2017

Related U.S. Application Data

(63) Continuation of application No. 14/947,072, filed on Nov. 20, 2015, now Pat. No. 9,609,293.

(30) Foreign Application Priority Data

Nov. 21, 2014 (JP) .................................. 2014-236981

(51) Int. Cl.
*H04N 9/31* (2006.01)
*G02B 26/00* (2006.01)
(Continued)

(52) U.S. Cl.
CPC ......... *G03B 21/204* (2013.01); *G02B 26/008* (2013.01); *G02B 27/141* (2013.01); *H04N 9/3117* (2013.01)

(58) Field of Classification Search
CPC .. G03B 21/006; G03B 21/008; G03B 21/005; G03B 21/204; H04N 9/3114; H04N 9/3117; F21S 10/02; G02B 26/008
See application file for complete search history.

(56) References Cited

U.S. PATENT DOCUMENTS

| 2008/0089089 A1 | 4/2008 | Hama et al. |
| 2010/0254153 A1 | 10/2010 | Hama et al. |

(Continued)

FOREIGN PATENT DOCUMENTS

| JP | 2008-004419 A | 1/2008 |
| JP | 2011-129354 A | 2/2011 |

(Continued)

*Primary Examiner* — William C Dowling
(74) *Attorney, Agent, or Firm* — Squire Patton Boggs (US) LLP (57) ABSTRACT

A wavelength converting member includes at least a first, second, and third regions, circumferentially on a disc-shaped light-transmissive substrate. The first region includes, from a light incident direction, a first and second phosphor layers. The first phosphor layer includes a first phosphor to absorb at least part of incident light and to emit a first light having a wavelength different from the incident light. The first phosphor layer defines an indentation in a surface on the second phosphor layer side, with a depth a half or more of the thickness of a portion of the first phosphor layer absent of the indentation. The second phosphor layer includes a second phosphor to absorb at least part of the first light emitted by the first phosphor and to emit a second light having a wavelength different from the first light, and is disposed in the indentation of the first phosphor layer.

16 Claims, 4 Drawing Sheets (51) Int. Cl.
*G03B 21/20* (2006.01)
*G02B 27/14* (2006.01)

(56) References Cited

U.S. PATENT DOCUMENTS

| | | |
|---|---|---|
| 2011/0149549 A1 | 6/2011 | Miyake |
| 2011/0228232 A1 | 9/2011 | Sakata et al. |
| 2014/0152964 A1 | 6/2014 | Sakata et al. |
| 2015/0098065 A1 | 4/2015 | Tanaka |
| 2016/0091712 A1 | 3/2016 | Egawa et al. |
| 2016/0266375 A1 | 9/2016 | Li et al. |

FOREIGN PATENT DOCUMENTS

| | | |
|---|---|---|
| JP | 2011-197212 A | 10/2011 |
| JP | 2011-243840 A | 12/2011 |
| JP | 2012-027052 A | 2/2012 |
| JP | 2012-078707 A | 4/2012 |
| JP | 2012-114040 A | 6/2012 |
| JP | 2012-243618 A | 12/2012 |
| JP | 2014-092599 A | 5/2014 |
| WO | 2006/038502 A1 | 4/2006 |

WAVELENGTH CONVERTING MEMBER AND PROJECTOR INCLUDING THE WAVELENGTH CONVERTING MEMBER

CROSS-REFERENCE TO RELATED APPLICATION

The present application is a 37 C.F.R. §1.53(b) continuation of U.S. patent application Ser. No. 14/947,072, filed on Nov. 20, 2015, which claims priority to Japanese Patent Application No. 2014-236981, filed on Nov. 21, 2014. The entire contents of all of the above applications are hereby incorporated by reference.

BACKGROUND

1. Field

Embodiments of the present invention relate to a wavelength converting member and a projector including the wavelength converting member.

2. Description of Related Art

In recent years, time-sharing type projectors have become popular, in which, light of a plurality of wavelengths is extracted in a time sharing manner, and the extracted light of a plurality of wavelengths is successively modulated to form and project an image.

As a light source device for such a time sharing type projector, for example, there is a known light source device that includes a light source to emit a predetermined light such as a white light and a rotating wheel (i.e., wavelength converting member) having a plurality of color filters arranged in the circumferential direction for converting the light of the light source into light of a plurality of different wavelength regions.

With such a light source device, light such as a white light emitted from the light source is allowed to incident on the rotating wheel that is spinning at a constant speed, and light of a plurality of wavelengths (e.g., a blue light, a green light, a red light) can be extracted in a time sharing manner.

Also, there has been proposed a light source device, that includes a light source, such as a semiconductor laser, configured to emit light of a single wavelength, and a rotating wheel (hereinafter may also be referred to as the "phosphor wheel") in which a plurality of wavelength converting region each including one or more appropriate fluorescent layers arranged in a circumferential direction of the wheel in place of a plurality of color filters.

The light of a single wavelength emitted by the light source such as a semiconductor laser is allowed to incident on the phosphor wheel, then, light of a plurality of wavelengths is extracted in a time sharing manner.

However, in the light source device having such a phosphor wheel, an increase in the intensity of the light irradiated on the phosphors in order to achieve higher output increases the amount of heat generated by the phosphors that elevates the temperature of the phosphors, which may resulting in a reduction of the wavelength converting efficiency of the phosphors.

In order to cope with such a problem, a light source device including a cooling fan is proposed.

Using the cooling fan, a cooling medium (air or the like) is diagonally blown in the unevenness formed at the phosphor on the phosphor wheel to cool the cooling medium (e.g., see JP 2012-78707 A).

Further, there is also proposed a light source device realizing enhanced cooling efficiency by employing a case that stores the phosphor wheel and an air blower blowing air in the phosphor wheel (e.g., see JP 2014-92599 A).

With the light source device disclosed in JP 2012-78707 A, in addition to the light source cooling device, the phosphor wheel cooling device is also required.

Accordingly, a reduction in size of the light source device becomes difficult.

Further, manufacturing costs also increase because of an increase in the number of components.

Still further, depending on the intended use, the simple cooling of the phosphor wheel fails to allow the phosphors to exhibit sufficient light emission efficiency.

Thus, in order to secure the sufficient amount of light, it may be difficult to reduce the size of the phosphor wheel (the wavelength converting member) and a projector.

With the light source device disclosed in JP 2014-92599 A, in addition to the light source cooling device, the phosphor wheel is needed to have an air blowing device.

Further, since the case storing the phosphor wheel and the air blower is required, a reduction in size of the light source device becomes difficult, and manufacturing costs also increase because of an increase in the number of components.

Still further, depending on the intended use, the simple cooling of the phosphor wheel fails to allow the phosphors to exhibit sufficient light emission efficiency.

Thus, in order to secure the sufficient amount of light, it may be difficult to reduce the size of the phosphor wheel (the wavelength converting member) and a projector.

SUMMARY

Accordingly, an object of the present invention is to improve disadvantages as described above, and to provide a wavelength converting member with high converting efficiency and a projector including the wavelength converting member.

A wavelength converting member according to an embodiment includes at least a first region, a second region, and a third region, which are arranged on a disc-shaped light-transmissive substrate in a circumferential direction. The first region includes a first phosphor layer and a second phosphor layer on the light-transmissive substrate in order from a light incident direction. The first phosphor layer contains a first phosphor absorbing at least part of incident light and emitting first light which is different in wavelength from the incident light. The first phosphor layer has indentations in a surface of a second phosphor layer side, a depth of each indentation being a half or more of a thickness of a portion of the first phosphor layer absent of the indentation. The second phosphor layer contains a second phosphor absorbing at least part of the first light emitted by the first phosphor and emitting second light which is different in wavelength from the first light. The second phosphor layer containing the second phosphor is arranged in the indentation of the first phosphor layer. The second region includes a third phosphor layer, the third phosphor layer containing a third phosphor absorbing at least part of incident light and emitting third light which is different in wavelength from the incident light. The third region is a region where a phosphor is not arranged on the substrate.

According to the embodiments of the present invention, a wavelength converting member with high converting efficiency can be provided.

Further, according to the embodiments of the present invention, a projector using the wavelength converting member with high converting efficiency. can be provided.

DETAILED DESCRIPTION

The wavelength converting member and the projector described below are to give a concrete form to technical ideas of the present invention, and the scope of the invention is not limited to those described below.

Further, the contents described in one embodiment can also be applied in other embodiments.

In the description below, when appropriate, terms which indicate specific directions or locations (for example, "up", "down", "right", "left" and other terms expressing those) may be applied, but those terms are used for easy understanding of the disclosure with reference to the accompanying drawings, and thus the technical scope of the disclosure shall not be limited by the meaning of those terms.

As a result of thorough study, the inventors of the present invention have devised the following structure.

In at least one of wavelength converting regions (a first region) included in a phosphor wheel, in addition to a second phosphor layer containing a phosphor (a second phosphor) to emit light of a target wavelength in the wavelength converting region, a first phosphor layer containing a phosphor (a first phosphor) to absorb light from the light source (i.e., incident light) and to emit light of a wavelength different from that of the light emitted by the second phosphor layer is arranged on a light incident direction side so that the first phosphor layer is located closer to the light source than the second phosphor layer is.

Then, the wavelength of at least part of the incident light is converted by the first phosphor, and the wavelength converted light of the first light (i.e., the light emitted by the phosphor that absorbed the light, the emitted light which is different in wavelength from the absorbed light) is allowed to be absorbed by the second phosphor so as to convert the wavelength to obtain a second light of a target wavelength.

As described above, converting the wavelength of incident light into the second light through the two stages of wavelength conversion can reduce the heat locally generated within the phosphor layers, as compared to obtaining a target wavelength in a single stage of wavelength conversion as in the conventional cases, so that a rise in the temperature of the phosphor can be reduced, and accordingly, efficiency of wavelength conversion can be improved.

According to certain embodiments of the present invention, in addition to the foregoing, the first phosphor layer defines indentations in the surface of the second phosphor layer side.

The depth of each indentation is a half or more of the thickness of a portion of the first phosphor layer absent of the indentation.

Portions of the second phosphor layer containing the second phosphor are placed in the indentations.

Placing the portions of the second phosphor in the indentations allows the first light to irradiate the second phosphor layer from respective lateral sides of the indentations.

As a result, the wavelength converting efficiency of the second phosphor layer can be increased, which allows improvement in the wavelength converting efficiency of the whole first region.

Next, embodiments of the present invention will be described in detail with reference to the drawings.

Portions denoted by same reference numerals in a plurality of drawings represent identical or equivalent portions or members.

The size or positional relationship of the members shown in the drawings may be exaggerated for the sake of clarity.

Note that, in the two-stage wavelength conversion described above, the greater the difference between the wavelength of the incident light and the wavelength of the light emitted by the second phosphor, the greater the difference in energy, and greater the amount of entire heat generation.

Thus, greater effect can be obtained.

Accordingly, one embodiment in which a blue light is employed as the incident light, a yellow or yellow-green phosphor is employed as the first phosphor, and a red phosphor is used as the second phosphor, will be illustrated below.

The combination of the incident light, the first phosphor, and the second phosphor can be appropriately selected so that the two-stage wavelength conversion can be performed.

Similarly, in the embodiment illustrated below, a green phosphor is employed as a phosphor included in a third phosphor layer in a second region, but any other appropriate phosphor may be employed.

1. Phosphor Wheel

Figure 1:
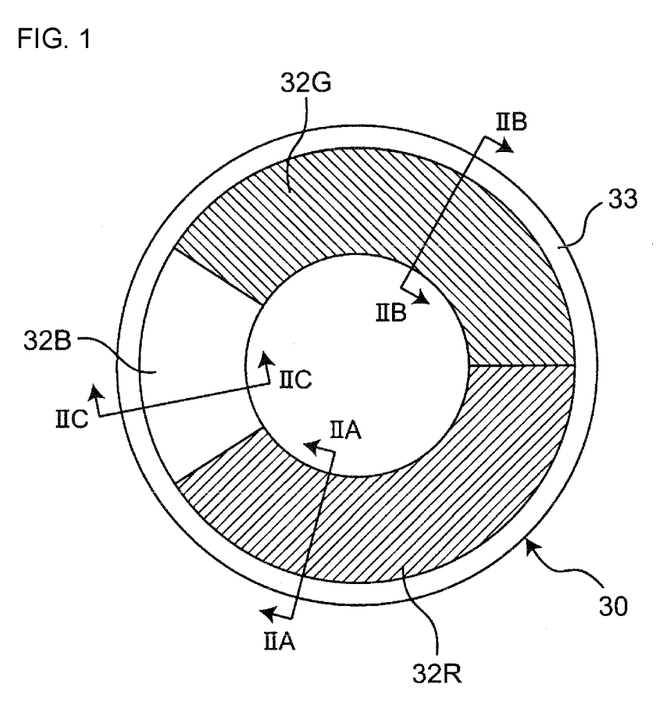
FIG. 1 is a schematic plan view of a phosphor wheel (wavelength converting member) 30 according to one embodiment of the present invention.

FIG. 1 is a schematic plan view of a phosphor wheel (wavelength converting member) 30 according to one embodiment of the present invention.

Figure 2A:
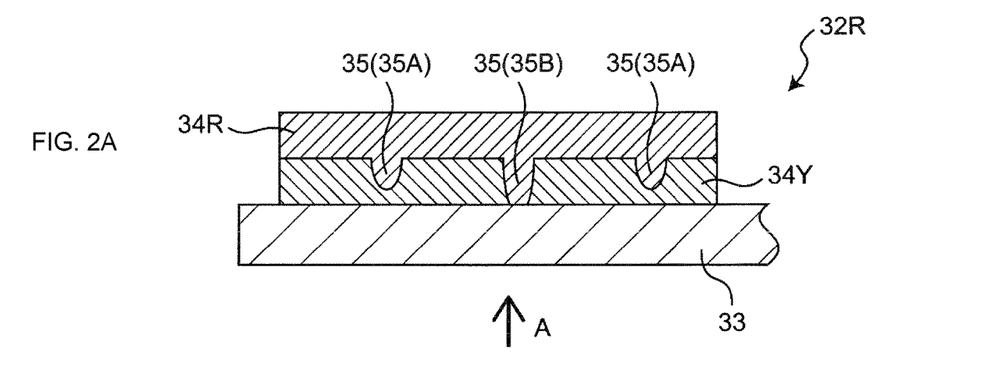
FIG. 2A is a schematic cross-sectional view taken along line IIA-IIA in FIG. 1.

FIG. 2A is a schematic cross-sectional view taken along line IIA-IIA in FIG. 1.

Figure 2B:
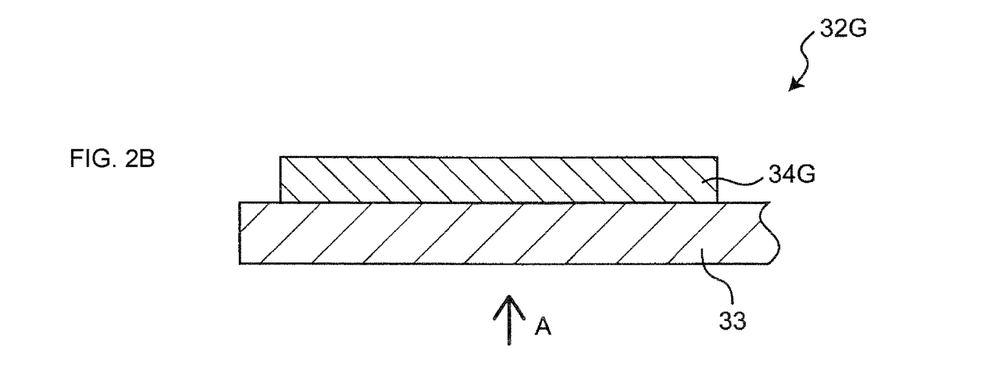
FIG. 2B is a schematic cross-sectional view taken along line IIB-IIB in FIG. 1.

FIG. 2B is a schematic cross-sectional view taken along line IIB-IIB in FIG. 1.

Figure 2C:
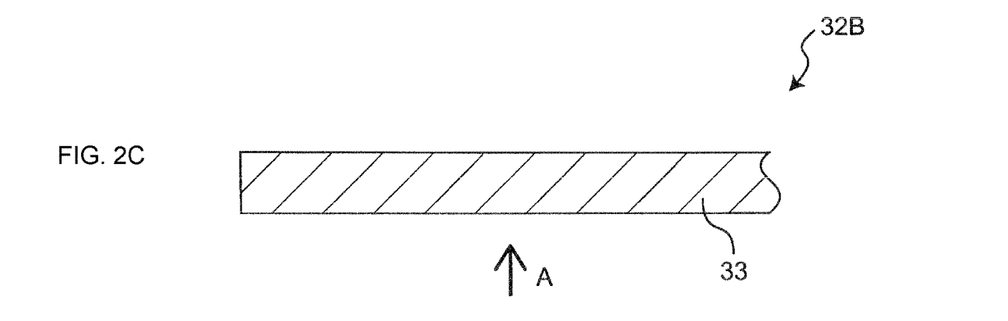
FIG. 2C is a schematic cross-sectional view taken along line IIC-IIC in FIG. 1.

FIG. 2C is a schematic cross-sectional view taken along line IIC-IIC in FIG. 1.

Arrow A shown in FIGS. 2A to 2C represents the propagating direction of the incident light, showing that the incident light propagates from below to above in the drawings.

The phosphor wheel 30 has a disc-shaped light-transmissive substrate 33.

The phosphor wheel 30 further includes, on the light-transmissive substrate 33, a red light converting region (a first region) 32R, a green light converting region (a second region) 32G, and a blue light converting region (a third region) 32B juxtaposed to one another in the circumferential direction.

In the present specification, the term "disc shape" refers not only to a perfect circle with a thickness but also to a shape close to a perfect circle.

Further, a rotatable shape with a center that allows rotation can also be included.

The regions described above will be described in more detail below.

(Red-Light Converting Region 32R)

As shown in FIG. 2A, the red light converting region 32R includes, on the light-transmissive substrate 33, a yellow phosphor layer 34Y and a red phosphor layer 34R in order from the light incident direction.

In the embodiment shown in FIG. 2A, the yellow phosphor layer 34Y is provided on the surface of the light-transmissive substrate 33 opposite to the light incident direction (i.e., on the surface on the light-emitting side), and the red phosphor layer 34R is provided on the yellow phosphor layer 34Y.

The yellow phosphor layer 34Y includes a yellow and/or yellow-green phosphor.

The yellow phosphor and the yellow-green phosphor (hereinafter, the yellow phosphor and the yellow-green phosphor are collectively referred to as the "yellow phosphor") absorb at least part of blue light emitted by a light source which will be detailed later and incident on the yellow phosphor layer 34Y.

Then, the yellow phosphor emits yellow light or yellow-green light (hereinafter yellow light and yellow-green light are collectively referred to as "yellow light") (emit yellow fluorescence).

The yellow light (first light) preferably has a wavelength band of 500 nm to 700 nm.

Examples of the yellow phosphor include a cerium-activated YAG-base phosphor such as Y3(Al,Ga)5O12:Ce, and Lu3Al5O12:Ce.

The red phosphor layer 34R includes a red phosphor.

The red phosphor absorbs at least part of yellow light emitted from the yellow phosphor layer 34Y and incident on the red phosphor layer 34R, and emits red light (second light) (emits red fluorescence).

The red light preferably has a wavelength band of 600 nm to 800 nm.

Examples of the red phosphor include (Sr,Ca)AlSiN$_3$:Eu, CaAlSiN$_3$:Eu, SrAlSiN$_3$:Eu, (Ba,Sr,Ca)$_2$Si$_5$N$_8$:Eu, (Sr,Ca)S:Eu, Ca-α sialon, 0.5MgF$_{2/3.5}$MgO.GeO$_2$:Mn, SrLiAl$_3$N$_4$:Eu, and K$_2$SiF$_6$:Mn.

The red phosphor layer 34R emits the red light in the emitting direction (upward in FIG. 2A).

The yellow phosphor layer 34Y defines indentations 35 in the surface of the red phosphor layer 34R side.

Portions of the red phosphor layer 34R containing the red phosphor are placed in the indentations.

That is, the red phosphor is present in the indentations 35.

The surface of the red phosphor layer 34R may either be flat or uneven, or protrusions may be formed in conformity to the indentations of the yellow phosphor layer 34Y.

The yellow light emitted from the yellow phosphor of the yellow phosphor layer 34Y propagates through the lateral surfaces of the indentations 35 and irradiated on the red phosphor in the indentations 35.

In the case where the indentations 35 are absent, a significant amount of light emitted in a lateral direction in FIG. 2A may attenuate by self-absorption or the like of the yellow phosphor layer 34Y, without being emitted from the yellow phosphor layer 34Y.

However, with the presence of the indentations 35, the amount of light emitted in the lateral direction in FIG. 2A from the yellow phosphor that arrives the red phosphor can be increased.

As a result, a larger amount of red light can be emitted from the red light converting region 32R, in other words, high wavelength converting efficiency can be attained.

Further, a further reduction in the thickness of the yellow phosphor layer 34Y and the red phosphor layer 34R becomes possible.

The depth of the indentations 35 is preferably 50% or more of the thickness of a portion of the yellow phosphor layer 34Y absent of the indentation 35.

With the indentations 35 of a sufficient depth; that is, a depth of 50% or more of the thickness of the portion of the yellow phosphor layer 34Y absent of the indentations 35, the wavelength converting efficiency can be greatly increased.

The depth of the indentations 35 and the thickness of the portion of the yellow phosphor layer 34Y where the indentations 35 are not formed may be determined by observing the cross section of the yellow phosphor layer 34Y with an optical microscope or a scanning electron microscope.

More specifically, the depth of the indentations 35 may be the depth of the deepest portion in a cross section, and the thickness of the portion of the yellow phosphor layer 34Y absent of the indentations 35 may be the average value obtained by measuring the thickness at least at ten locations in the yellow phosphor layer 34Y absent of the indentations in the cross section (e.g., a portion where the red phosphor is not intruded more than the length of one particle of the yellow phosphor).

The indentations 35 may be, as shown in FIG. 2A as indentations 35A, made into without penetrating the yellow phosphor layer 34Y. That is, the bottoms of the indentations 35 are in the yellow phosphor layer 34Y, in other words, provided as non-penetrating indentations).

The indentations 35 may also be, as shown in FIG. 2A as an indentation 35B, made penetrate through the yellow phosphor layer 34Y (through-hole indentations).

At the indentations 35B, a portion of the incident light reaches the red phosphor in the indentations 35 without passing through the yellow phosphor layer 34Y.

However, the resulting increase in the temperature is small and a larger effect in the converting efficiency due to the presence of the indentation 35B can be exhibited.

The indentation 35 may be defined in any appropriate shape.

A preferable shape may be a groove-shape extending in the direction approximately perpendicular to the surface of FIG. 2A, for example.

With the surfaces defining each indentation 35 extending for a certain length as in the groove-shape, a greater amount of yellow light can arrive at the red phosphor in the indentation 35 passing through the side surfaces of the indentation.

The depth of the groove may not be constant.

Examples of other preferable shapes include an approximately circle, an approximately quadrangle, and an indentation.

The yellow phosphor preferably has an average particle size greater than the average particle size of the red phosphor.

The yellow phosphor preferably has an average diameter at least 1.5 times, and more preferably at least twice, as great as the average particle size of the red phosphor.

Thus, the indentations 35 can be easily formed, and the red phosphor can be easily arranged in the indentation 35.

For example, the average particle size of the yellow phosphor may be 20.0 nm to 25.0 nm, and the average particle size of the red phosphor may be 6.5 nm to 9.0 nm.

In the present embodiment, the particle diameter of the particles of the phosphor may be any of the major axis diameter, the minor axis diameter, the Feret diameter, the equivalent diameter (image analysis, light shielding, the Coulter Principle), the effective diameter (sedimentation, scattering using laser diffraction) and the like, because the shape of the particles is not uniform.

Further, the average particle diameter of any of the foregoing particle diameters may be employed.

The average particle diameter can be measured and calculated by a commercially available particle measuring device or particle size distribution measuring device.

For example, the average particle diameter may be represented by a Fisher Sub Sieve Sizer's number (F.S.S S.No.), that is a particle size obtained by using an air permeability method, which is indicated by so-called "a D-bar (a bar over D)".

The light-transmissive substrate 33 preferably has a disc-shape, but as will be described below, it may have any appropriate shape that can be rotated by a driving device such as a motor so that the red-light converting region 32R, the green-light converting region 32G, and the blue-light converting region 32B arranged in the circumferential direction (e.g., arranged coaxially) can be shifted in the circumferential direction.

The light-transmissive substrate 33 is made of a material having a high light-transmissivity.

Examples of such materials having a high light-transmissivity include glass, resin, sapphire, quartz, CaF2 or the like.

The material having a thermal conductivity of 5 W/m·K or more is more preferable, and a monocrystal, a light-transmissive polycrystal, or a light-transmissive sintered body of sapphire, quartz, CaF2, GaN, AlN, SiC or the like can be employed.

In the embodiment shown in FIG. 2A, on the emitting side of the light-transmissive substrate 33 (emitting side of the light from the light source), the yellow phosphor layer 34Y and the red phosphor layer 34R are formed in order from the light-transmissive substrate 33 side.

With the red light converting region 32R having such a structure, at least part of a blue light incident on the yellow phosphor layer 34Y is absorbed by the yellow phosphor of the yellow phosphor layer 34Y, and yellow light is emitted.

Of the yellow light, at least a portion of the light incident on the red phosphor layer 34R is absorbed by the red phosphor of the red phosphor layer 34R, and a red light is emitted.

Then, the red light is emitted from the light emitting side of the red phosphor layer 34R (the upper surface side of the red phosphor layer 34R in FIG. 2A).

(Green-Light Converting Region 32G)

As shown in FIG. 2B, the green-light converting region 32G includes a green phosphor layer 34G on the light-transmissive substrate 33.

In the embodiment shown in FIG. 2B, the green phosphor layer 34G is provided on the surface on the light emitting side of the light-transmissive substrate 33.

The green phosphor layer 34G includes a green phosphor.

The green phosphor absorbs at least a portion of blue light emitted by the light source unit which will be detailed later and incident on the green phosphor layer 34G.

Then, the green phosphor emits green light (emits green fluorescent).

The green light (third light) preferably has a wavelength band of 500 nm to 560 nm.

A preferable green phosphor may be, $\beta$-$Si_{6-z}Al_zO_zN_{8-z}$:Eu, $Lu_3Al_5O_{12}$:Ce, $Ca_8MgSi_4O_{16}C_{12}$:Eu, $Ba_3Si_6O_{12}N_2$:Eu, $(Sr,Ba,Ca)Si_2O_2N_2$:Eu or the like.

In the green light converting region 32G having such a configuration, at least a portion of blue light incident on the green phosphor layer 34G is absorbed by the green phosphor of the green phosphor layer 34G, and green light is emitted.

Then, the green light is emitted from the light emitting side of the green phosphor layer 34G (the upper surface side of the green phosphor layer 34G in FIG. 2B).

(Blue-Light Converting Region 32B)

As shown in FIG. 2C, the blue light converting region 32B is a region where no phosphor is arranged on the light-transmissive substrate 33.

Accordingly, blue light incident on the surface on the light incident side of the light-transmissive substrate 33 (the lower surface in the embodiment in FIG. 2C) is emitted from the surface on the light emitting side of the light-transmissive substrate 33 (the upper surface in the embodiment in FIG. 2C) without having its wavelength changed (i.e., staying as the blue light).

The proportion of the red-light converting region 32R, the green-light converting region 32G, and the blue-light converting region 32B in the phosphor wheel 30 can be determined as needed.

For example, in the case of using the phosphor wheel 30 in a projector, an appropriate proportion can be calculated from the chromaticity of white and the efficiency of the phosphors required of a projector and the like.

For example, in the embodiment shown in FIG. 1, the red-light converting region 32R, the green-light converting region 32G, and the blue-light converting region 32B are 150 degrees, 150 degrees, and 60 degrees, respectively.

Further, in the present embodiment, though three regions of the red-light converting region 32R, the green-light converting region 32G, and the blue-light converting region 32B are provided, four or more regions may be provided.

For example, in addition to the red-light converting region 32R, the green-light converting region 32G, and the blue-light converting region 32B, a yellow-light converting region in which the yellow phosphor layer 34Y containing the yellow phosphor is arranged on the light-transmissive substrate 33 (in the yellow-light converting region, a red phosphor layer containing the red phosphor is not arranged) may be provided.

In this case, similarly to FIG. 2B, preferably, a single phosphor layer (the yellow phosphor layer) is provided on the light-transmissive substrate.

Further, at least one region selected from the red-light converting region 32R, the green-light converting region 32G, and the blue-light converting region 32B may be provided by two or more in number.

2. Variation

Figure 3A:
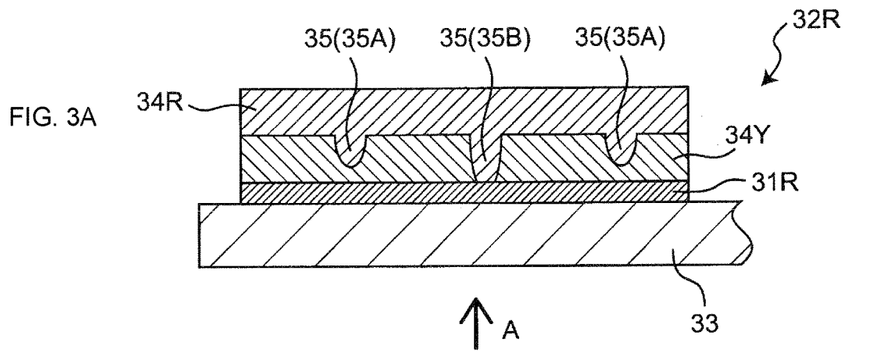
FIG. 3A is a schematic cross-sectional view showing Variation of a red light converting region 32R shown in FIG. 2A.

FIG. 3A is a schematic cross-sectional view showing Variation of the red-light converting region 32R shown in FIG. 2A.

Figure 3B:
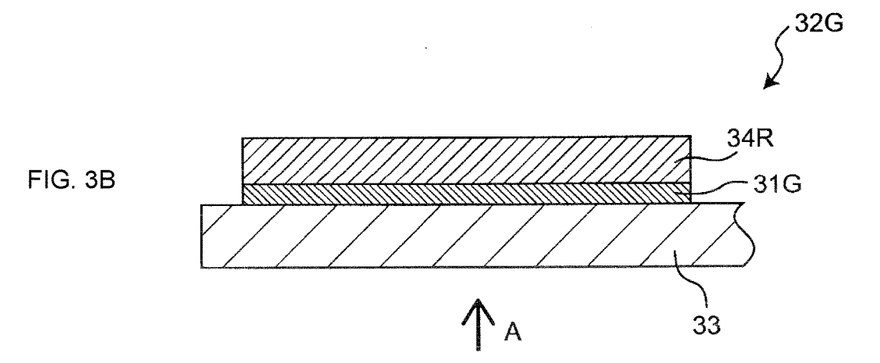
FIG. 3B is a schematic cross-sectional view showing Variation of a green light converting region 32G shown in FIG. 2B.

FIG. 3B is a schematic cross-sectional view showing Variation of the green-light converting region 32G shown in FIG. 2B.

Figure 3C:
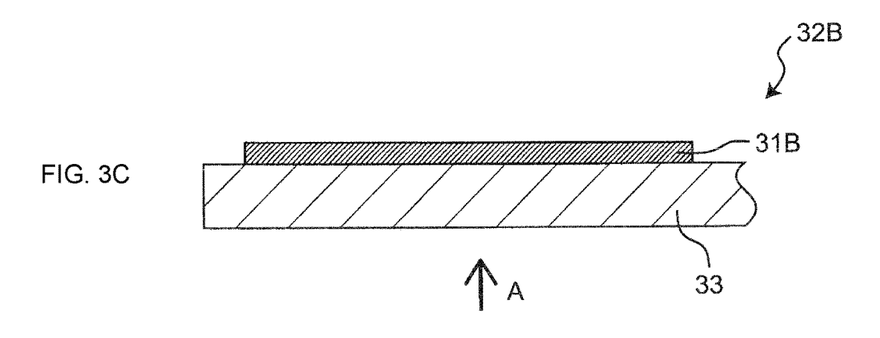
FIG. 3C is a schematic cross-sectional view showing Variation of a blue light converting region 32B shown in FIG. 2C.

FIG. 3C is a schematic cross-sectional view showing Variation of the blue-light converting region 32B shown in FIG. 2C.

Next, the difference of the red-light converting region 32R, the green-light converting region 32G and the blue-light converting region 32B according to Variation shown in FIGS. 3A to 3C from the red-light converting region 32R, the green-light converting region 32G, and the blue-light converting region 32B shown in FIGS. 2A to 2C will be mainly described.

Accordingly, the configurations that are not particularly described below may be similar to the configurations of the red-light converting region 32R, the green-light converting region 32G, and the blue-light converting region 32B shown in FIGS. 2A to 2C.

In the red-light converting region 32R shown in FIG. 3A, a dielectric layer 31R is arranged between the yellow phosphor layer 34Y and the light-transmissive substrate 33.

That is, the dielectric layer 31R is provided between the light-transmissive substrate 33 and the yellow phosphor layer 34Y and the red phosphor layer 34R.

As used herein, the dielectric layer is a dielectric multi-layer film in which at least two dielectrics differing in index of refraction are stacked.

The dielectric layer 31R is configured to allow blue light (e.g., light of a wavelength of 400 nm to 490 nm) transmitting therethrough, and to reflect fluorescent, that is, the light having its wavelength converted by a phosphor (e.g., light of a wavelength of 490 nm or more).

In the present Variation, the expression "the dielectric layer allows transmitting particular light therethrough" implies that the transmissivity of the dielectric layer to the particular light is 70% or more in a substantially perpendicular direction.

Also, the expression "the dielectric layer allows reflecting particular light" implies that the reflectivity of the dielectric layer to the particular light is 70% or more in a substantially perpendicular direction.

With the dielectric layer 31R, blue light incident from the light source can be efficiently guided to the yellow phosphor layer 34Y, and the yellow light propagating from the yellow phosphor layer 34Y toward the light-transmissive substrate 33 can be reflected.

Accordingly, the yellow light can be efficiently guided to the red phosphor layer, and the red light propagating from the red phosphor layer 34R toward the light-transmissive substrate 33 can be reflected.

Therefore, the light having its wavelength converted by the red phosphor (the red light) can be efficiently used.

In the embodiment shown in FIG. 3A, the dielectric layer 31R is arranged between the yellow phosphor layer 34Y and the light-transmissive substrate 33.

Alternatively or in addition thereto, the dielectric layer 31R may be formed on the surface opposite to the surface of the light transmissive substrate 33 where the yellow phosphor layer 34Y and the red phosphor layer 34R are formed.

That is, the dielectric layer 31R may be formed on one of or both of the light incident surface and the light emitting surface of the light-transmissive substrate 33.

In the green-light converting region 32G shown in FIG. 3B, a dielectric film 31G is arranged between the green phosphor layer 34G and the light-transmissive substrate 33.

The green phosphor layer 34G may have a flat surface or an uneven surface.

Presence of uneven shape is preferable because the efficiency of conversion to green can be enhanced.

The dielectric layer 31G allows the blue light transmitting there through, and reflects green light.

With the dielectric layer 31G, blue light incident from the light source can be efficiently guided to the green phosphor layer 34G, and the green light propagating from the green phosphor layer 34G toward the light-transmissive substrate 33 can be reflected.

Therefore, the light having its wavelength converted by the green phosphor (the green light) can be efficiently used.

In the embodiment shown in FIG. 3B, the dielectric film 31G is arranged between the green phosphor layer 34Y and the light-transmissive substrate 33.

Alternatively or in addition thereto, the dielectric layer 31G may be formed on the surface opposite to the surface of the light transmissive substrate 33 where the green phosphor layer 34G is formed.

That is, the dielectric layer 31G may be formed on one of or both of the light incident surface and the light emitting surface of the light-transmissive substrate 33.

In the blue-light converting region 32B shown in FIG. 3C, a dielectric film 31B is arranged on the light emitting surface of the light-transmissive substrate 33.

The dielectric layer 31B is configured to allow blue light transmitting therethrough.

With the dielectric layer 31B, blue light incident from the light source to the light-transmissive substrate 33 can be efficiently emitted from the emitting surface of the light-transmissive substrate 33.

In the embodiment shown in FIG. 3C, the dielectric film 31B is arranged on the light emitting surface of the light-transmissive substrate 33.

Alternatively or in addition thereto, the dielectric layer 31B may be formed on the light incident surface of the light transmissive substrate 33.

That is, the dielectric layer 31B may be formed on one of or both of the light incident surface and the light emitting surface of the light-transmissive substrate 33.

3. Method of Manufacturing Phosphor Wheel

Next, in the following, a description will be given of one example of a method of manufacturing the phosphor wheel 30, particularly a method of forming the indentations 35 at the yellow phosphor layer 34Y of the red-light converting region 32R.

The light-transmissive substrate 33 that is made of a light transmissive material such as glass, resin, sapphire or the like and that is disc-shaped is provided.

Using sputtering, deposition, vapor deposition such as CVD or the like as needed, the dielectric layers 31R, 31G, and 31B are formed on the light-transmissive substrate 33.

Red-Light Converting Region 32R

At a portion on the light-transmissive substrate 33 to be the red-light converting region 32R, the yellow phosphor layer 34Y is formed by screen printing.

Further, on the yellow phosphor layer 34Y, the red phosphor layer 34R is formed by screen printing.

A vehicle made of the yellow phosphor, an organic solvent, and resin is mixed (agitated) with inorganic particles (alumina particles or the like) and degassed, to prepare a yellow phosphor paste.

The vehicle used herein can be appropriately selected, and for example, a mixture of ethyl cellulose (resin), terpineol (solvent), and 2-(2-Butoxyethoxy)ethanol (solvent) can be used.

The organic solvent and resin used here are an organic solvent and resin from which the organic component can be removed through drying and baking.

Resin that decomposes at 300° C. or more is preferable.

In particular, in the case where the red phosphor (CASN or the like) is formed, resin that decomposes at 550° C. or less is more preferable.

Examples of such a resin include an ethyl cellulose resin and an acrylic resin.

Preferably, the yellow phosphor has an average particle diameter greater than that of the red phosphor, and preferably at least 1.5 times, and more preferably at least twice as great as the average particle diameter of the red phosphor.

Thus, the groove-shaped indentations 35 can be easily formed in the yellow phosphor layer 34Y, and the red phosphor can be more easily placed in the indentations 35.

Further, the yellow phosphor paste preferably has a high viscosity.

The yellow phosphor paste of a high viscosity facilitates the formation of unevenness in the surface, which allows formation of the phosphor layer 34Y with relatively large thickness.

Accordingly, the groove-shaped indentations 35 can be easily formed.

However, the indentations 35 cannot be easily formed with the yellow phosphor layer 34Y of an excessive thickness.

Thus, the portion of the yellow phosphor layer 34Y absent of the indentations 35 is preferably formed with an average thickness of twice to five times greater than the average particle diameter of the yellow phosphor.

The obtained yellow phosphor paste is applied by screen printing and the printed paste is dried, for example, at 170° C. for 15 minutes.

In the drying, the solvent component of the vehicle is evaporated and the volume is reduced, and the groove-shaped indentations 35 are formed at the portions where the density of the yellow phosphor is low.

The groove-shaped indentations 35 tend to be formed at the portions where wires (or fibers) of the mesh used in the screen printing cross each other.

Accordingly, the depth (including the proportion of the through-hole indentation 35B) and the density (including the length of the groove) of the indentations 35 can be adjusted with the gauge of the mesh (the size of mesh, the diameter of the wire and the like), Next, the red phosphor, the vehicle, and a binding agent such as alumina particles are mixed (agitated) and degassed, to prepare a red phosphor paste.

The red phosphor paste preferably has a viscosity lower than that of the yellow phosphor paste.

This makes it easier for the formed red phosphor layer 34R to enter the indentations of the yellow phosphor layer 34Y.

Further, the density of the red phosphor can be increased.

This suppresses blue light from transmitting through the red-light converting region 32R without having its wavelength converted.

This effect can be more surely attained in the case where the red phosphor has an average particle diameter smaller than that of the yellow phosphor.

The red phosphor paste is screen-printed on the screen-printed and dried yellow phosphor paste.

With this screen printing, the red phosphor can be placed in the indentations 35.

Thereafter, the paste is dried, for example, at 170° C. for 15 minutes or more.

Next, the dried yellow phosphor paste and red phosphor paste are baked.

The baking is performed at a temperature in a range of 400° C. to 550° C., for example.

Thus, the resin in the vehicle can be removed.

As a result, the yellow phosphor layer 34Y made of the yellow phosphor and the alumina nanoparticles and the red phosphor layer 34R made of the red phosphor and the alumina nanoparticles can be formed.

The baking is generally performed after drying a green phosphor paste, which will be described below, and simultaneously with baking in forming the green phosphor layer 34G (i.e., the light-transmissive substrate 33 is heated using a heating device, for example, an electric furnace to carry out baking, thus, the red-light converting region 32R and the green-light converting region 32G are simultaneously formed).

Green Light Converting Region 32G

At a portion on the light-transmissive substrate 33 designated for the green-light converting region 32G, the green phosphor layer 34G is formed by screen printing.

The green phosphor, the vehicle, and a binding agent such as alumina nanoparticles are mixed (agitated) and degassed, to prepare a green phosphor paste.

The green phosphor paste is screen-printed on the light-transmissive substrate 33, and thereafter dried at 170° C. for 30 minutes or more, for example.

Then, the dried green phosphor paste and red phosphor paste are baked.

The baking is performed at a temperature in a range of 400° C. to 550° C., for example.

As a result, the green phosphor layer 34G made of the green phosphor and the alumina nanoparticles can be formed.

Thus, in the circumferential direction of the light-transmissive substrate 33, the region where the red-light converting region 32R and the green-light converting region 32G are not formed provides the blue-light converting region 32B.

Note that, after the yellow phosphor layer 34Y, the red phosphor layer 34R, and the green phosphor layer 34G are formed, on the phosphor layers and the light-transmissive substrate 33, an Al2O3 film or SiO2 film may be formed by using an ALD (Atomic Layer Deposition) method or a sol-gel method, for example.

4. Projector

Figure 4:
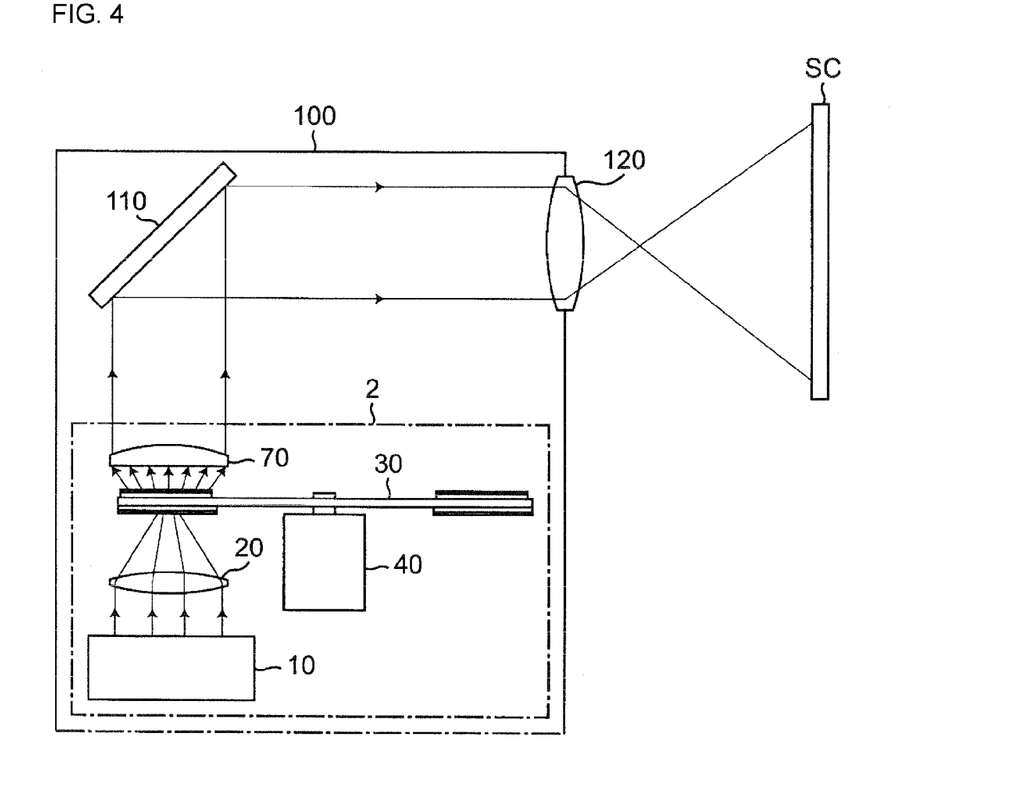
FIG. 4 is a schematic diagram showing the structure of a projector 100 including the phosphor wheel 30 according to the embodiment of the present invention.

FIG. 4 is a schematic diagram showing a configuration of a projector 100 including the phosphor wheel 30 of the present invention.

A light source device 2 includes a light source unit 10 having a plurality of semiconductor lasers, a condensing lens 20, the phosphor wheel 30, a drive motor 40 to rotate the phosphor wheel 30, and a light receiving lens 70.

Firstly, the overview of the light source device will be described according to the flow of light emitted from the light source unit 10.

In the present embodiment, light of a prescribed wavelength band (herein, the light is blue light as an example) is emitted from the semiconductor lasers placed on the light source unit 10.

The emitted light is incident on the condensing lens 20 and condensed by the condensing lens 20, to be incident on the phosphor wheel 30 rotated by the drive motor 40.

Since the phosphor wheel 30 is rotating, the blue light emitted from the semiconductor lasers is incident on the blue-light converting region 32B, the red-light converting region 32R, and the green-light converting region 32G juxtaposed to one another in the circumferential direction in order.

When the blue light is incident on the blue-light converting region 32B, the blue light transmits through the phosphor wheel 30 without having its wavelength converted.

Then, the blue light is emitted from the light emitting side of the phosphor wheel 30.

When the blue light is incident on the red-light converting region 32R, the blue light has its wavelength converted while transmitting through the phosphor wheel 30, and red light is emitted from the light emitting side of the phosphor wheel 30.

When the blue light is incident on the green-light converting region 32G, the blue-light has its wavelength converted while transmitting through the phosphor wheel 30, and green light is emitted from the light emitting side of the phosphor wheel 30.

Hence, when the blue light is incident from the condensing lens 20 on the phosphor wheel 30, the blue light, the red light and the green light are time sharingly output from the phosphor wheel 30, and incident on the light receiving lens 70.

Then, the light beams are condensed by the light receiving lens 70, and emitted from the light source device 2.

In order to improve the color of the emitting light, a dichroic mirror may be provided in the light source device 2.

The dichroic mirror is provided behind the phosphor wheel 30, and may either be fixed or allowed to rotate in synchronization with the phosphor wheel 30.

In the case of arranging the dichroic mirror rotatable in synchronization with the phosphor wheel, it may share the same motor with fluorescent material wheel, or may be rotated by the other motor.

When rotated by the same motor, the dichroic mirror may be in contact with or may be spaced apart from the phosphor wheel 30.

In the case where the blue light is emitted from the semiconductor lasers, the light of a wavelength of 370 nm to 500 nm is desirable, and 420 nm to 500 nm is more desirable.

The drive motor 40 is a brushless DC drive motor for example, and arranged such that its rotating shaft and the optical axis of the condensing lens 20 are in parallel to each other.

Further, the drive motor 40 is fixed such that the plane of the phosphor wheel 30 becomes perpendicular to the rotating shaft of the drive motor 40.

The rotation speed of the drive motor 40 is determined based on the frame rate (the number of frames per second, represented by unit of [fps]) of the reproduced moving images.

For example, in the case of reproducing moving images of 60 [fps], the rotation speed of the drive motor 40 (i.e., the phosphor wheel 30) may be determined to an integral multiple of 60 rotations per minute.

The light emitted from the light source device 2 is reflected by a DMD (Digital Micromirror Device) element 110 that is a spatial light modulator.

Then, the light is condensed using a projecting device such as a projecting lens 120 and projected on a screen SC.

In the DMD element, fine mirrors corresponding to the pixels of an image projected on the screen are arranged in a matrix.

The angle of each of the mirrors can be changed to turn ON/OFF the light emitted to the screen on the order of microseconds.

Further, the shade of the light incident on the projecting lens is altered by the ratio between the mirror ON time and the mirror OFF time, so that the shading display based on the image data of the projected image can be realized.

Any appropriate optical element may be interposed between the light source device 2 and the DMD element 110.

For example, a lens, a mirror, a dichroic mirror, a light pipe, a prism, a lens array and the like may be interposed.

In the case of interposing a dichroic mirror to improve the color of emitting light, the dichroic mirror may either be fixed or rotatable in synchronization with the phosphor wheel.

The projecting lens 120 may be made of a combination of a plurality of lenses.

In the present embodiment, a DMD element is used as an optical modulating element, but any other appropriate optical modulating element can be used according to the purpose of use.

Further, the light source device 2 according to certain embodiments of the present invention and the projector using the light source device 2 are not limited to the embodiment described above and the present invention includes other various embodiments.

What is claimed is:

1. A wavelength converting member, comprising:
   first region disposed on a substrate,
   wherein the first region includes a first phosphor layer and a second phosphor layer on the light-transmissive substrate, in order, from a light incident direction,
   wherein the first phosphor layer comprises a first phosphor configured to absorb at least a portion of incident light and to emit a first light having a wavelength different from the incident light, the first phosphor layer defining an indentation in a surface on a second phosphor layer side, with a depth a half or more of a thickness of a portion of the first phosphor layer absent of the indentation,
   wherein the second phosphor layer comprises a second phosphor configured to absorb at least a portion of the first light emitted by the first phosphor and to emit a second light having a wavelength different from the first light,
   wherein the second phosphor layer comprising the second phosphor is disposed in the indentation of the first phosphor layer.

2. The wavelength converting member according to claim 1, wherein an average particle diameter of the first phosphor is greater than an average particle diameter of the second phosphor.

3. The wavelength converting member according to claim 2, wherein the average particle diameter of the first phosphor is at least twice as great as the average particle diameter of the second phosphor.

4. The wavelength converting member according to claim 1, further comprising a second region and a third region, the first, the second and the third regions being disposed on the substrate in a circumferential direction,
   wherein the second region comprises a third phosphor layer including a third phosphor configured to absorb at least a portion of incident light and to emit a third light having a wavelength different from the incident light, and
   wherein the third region comprises a region absent of a phosphor.

5. The wavelength converting member according to claim 1, wherein the substrate is a disc-shaped light-transmissive substrate.

6. The wavelength converting member according to claim 5, wherein the first phosphor layer and the second phosphor layer are disposed on a light emitting side of the light-transmissive substrate.

7. The wavelength converting member according to claim 6, further comprising, between the light-transmissive substrate and the first phosphor layer, a dielectric layer configured to transmit the incident light exciting the first phosphor and to reflect the first light emitted by the first phosphor and the second light emitted by the second phosphor.

8. The wavelength converting member according to claim 6, further comprising, on a surface of the light-transmissive substrate opposite to a surface where the first phosphor layer and the second phosphor layer are disposed, a dielectric layer configured to transmit the incident light exciting the first phosphor and to reflect the first light emitted by the first phosphor and the second light emitted by the second phosphor.

9. A projector, comprising:
a light source device including the wavelength converting member according to claim 1, and a light source supplying the wavelength converting member with incident light;
a light modulating device configured to form an image by successively modulating light of a plurality of wavelengths emitted by the light source device, based on image data; and
a projecting device configured to enlarge and project the image.

10. A projector, comprising:
a light source device including the wavelength converting member according to claim 2, and a light source supplying the wavelength converting member with incident light;
a light modulating device configured to form an image by successively modulating light of a plurality of wavelengths emitted by the light source device, based on image data; and
a projecting device configured to enlarge and project the image.

11. A projector, comprising:
a light source device including the wavelength converting member according to claim 3, and a light source supplying the wavelength converting member with incident light;
a light modulating device configured to form an image by successively modulating light of a plurality of wavelengths emitted by the light source device, based on image data; and
a projecting device configured to enlarge and project the image.

12. A projector, comprising:
a light source device including the wavelength converting member according to claim 4, and a light source supplying the wavelength converting member with incident light;
a light modulating device configured to form an image by successively modulating light of a plurality of wavelengths emitted by the light source device, based on image data; and
a projecting device configured to enlarge and project the image.

13. A projector, comprising:
a light source device including the wavelength converting member according to claim 5, and a light source supplying the wavelength converting member with incident light;
a light modulating device configured to form an image by successively modulating light of a plurality of wavelengths emitted by the light source device, based on image data; and
a projecting device configured to enlarge and project the image.

14. A projector, comprising:
a light source device including the wavelength converting member according to claim 6, and a light source supplying the wavelength converting member with incident light;
a light modulating device configured to form an image by successively modulating light of a plurality of wavelengths emitted by the light source device, based on image data; and
a projecting device configured to enlarge and project the image.

15. A projector, comprising:
a light source device including the wavelength converting member according to claim 7, and a light source supplying the wavelength converting member with incident light;
a light modulating device configured to form an image by successively modulating light of a plurality of wavelengths emitted by the light source device, based on image data; and
a projecting device configured to enlarge and project the image.

16. A projector, comprising:
a light source device including the wavelength converting member according to claim 8, and a light source supplying the wavelength converting member with incident light;
a light modulating device configured to form an image by successively modulating light of a plurality of wavelengths emitted by the light source device, based on image data; and
a projecting device configured to enlarge and project the image.

* * * * *